United States Patent
Huang

(10) Patent No.: US 12,473,780 B2
(45) Date of Patent: Nov. 18, 2025

(54) WINDOW SHADE AND ACTUATING SYSTEM THEREOF

(71) Applicant: Teh Yor Co., Ltd., New Taipei (TW)

(72) Inventor: Chung-Chen Huang, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 354 days.

(21) Appl. No.: 18/366,580

(22) Filed: Aug. 7, 2023

(65) Prior Publication Data

US 2024/0052694 A1 Feb. 15, 2024

Related U.S. Application Data

(60) Provisional application No. 63/370,864, filed on Aug. 9, 2022.

(51) Int. Cl.
*E06B 9/322* (2006.01)
*E06B 9/262* (2006.01)
*E06B 9/80* (2006.01)

(52) U.S. Cl.
CPC .............. *E06B 9/322* (2013.01); *E06B 9/262* (2013.01); *E06B 2009/2625* (2013.01); *E06B 2009/3222* (2013.01); *E06B 2009/807* (2013.01)

(58) Field of Classification Search
CPC .. E06B 9/322; E06B 9/262; E06B 2009/2625; E06B 2009/3222; E06B 2009/807
See application file for complete search history.

(56) References Cited

U.S. PATENT DOCUMENTS

| 2019/0264502 A1* | 8/2019 | Marocco .................. E06B 9/74 |
| 2021/0222489 A1 | 7/2021 | Huang et al. |
| 2021/0277712 A1 | 9/2021 | Huang et al. |

FOREIGN PATENT DOCUMENTS

| CN | 113137171 A | 7/2021 |
| CN | 113374390 A | 9/2021 |
| EP | 3199742 A1 | 8/2017 |

(Continued)

OTHER PUBLICATIONS

International Search Report in the related PCT application No. PCT/US2023/029662, dated Dec. 7, 2023.

(Continued)

*Primary Examiner* — Beth A Stephan
(74) *Attorney, Agent, or Firm* — Chen Yoshimura LLP

(57) ABSTRACT

An actuating system for a window shade includes a transmission axle, a brake assembly and a clutch. The transmission axle is rotationally coupled to an axle adapter for rotation about a longitudinal axis. The brake assembly includes an arrester, a rotary element rotatable about the longitudinal axis, and a shift collar configured to couple and decouple the rotary element from the arrester, the shift collar switching from a decoupling position to a coupling position in response to a rotation of the rotary element in a first direction and from the coupling position to the decoupling position in response to a rotation of the rotary element in an opposite second direction. The clutch can couple and decouple the axle adapter from the rotary element, and has a clutch actuator rotatable about the longitudinal axis to switch the clutch between a clutch coupling state and a clutch decoupling state.

21 Claims, 20 Drawing Sheets

(56) References Cited

FOREIGN PATENT DOCUMENTS

| | | |
|---|---|---|
| JP | 2022-59836 A | 4/2022 |
| WO | 2012/026912 A1 | 3/2012 |

OTHER PUBLICATIONS

Written Opinion in the related PCT application No. PCT/US2023/029662, dated Dec. 7, 2023.
Taiwanese Office Action, dated Dec. 29, 2023, in a counterpart Taiwanese patent application, No. TW 112129671. (English translation of the search report is attached.).

\* cited by examiner

WINDOW SHADE AND ACTUATING SYSTEM THEREOF

CROSS-REFERENCE TO RELATED APPLICATION(S)

This application claims priority to U.S. provisional patent application No. 63/370,864 filed on Aug. 9, 2022, the disclosure of which is hereby incorporated by reference.

BACKGROUND

1. Field of the Invention

The present invention relates to window shades, and actuating systems used in window shades.

2. Description of the Related Art

Some window shades may use an operating cord for raising a bottom part of the window shade and a wand for lowering the bottom part. More specifically, the operating cord may be pulled downward to drive a rotary part in rotation, which can be transmitted to a drive axle so that the drive axle can rotate for winding a suspension cord connected with the bottom part. When a user rotates the wand, an arrester coupled to the wand can release the drive axle, which can accordingly rotate as the bottom part lowers under gravity action.

In the aforementioned type of window shades, the braking force of the arrester may create resistance against the rotation of the drive axle when the rotary part and the drive axle rotate for raising the bottom part. As a result, the pulling force applied by the user has to overcome the braking force to be able to raise the bottom part, which may require increased effort from the user.

SUMMARY

The present application describes a window shade and an actuating system for use with the window shade that can reduce internal friction and can be conveniently operated with reduced effort.

According to an embodiment, an actuating system for a window shade includes a transmission axle, a brake assembly and a clutch. The transmission axle has a longitudinal axis and is rotationally coupled to an axle adapter, the transmission axle and the axle adapter being rotatable about the longitudinal axis. The brake assembly includes an arrester, a rotary element rotatable about the longitudinal axis, and a shift collar configured to couple the rotary element to the arrester and decouple the rotary element from the arrester, the shift collar switching from a decoupling position to a coupling position in response to a rotation of the rotary element in a first direction and from the coupling position to the decoupling position in response to a rotation of the rotary element in a second direction opposite to the first direction. The clutch is configured to couple and decouple the axle adapter from the rotary element, the clutch having a clutch actuator rotatable about the longitudinal axis, the clutch actuator being operable to switch the clutch between a clutch coupling state and a clutch decoupling state.

Moreover, the present application provides a window shade that can incorporate the actuating system.

DETAILED DESCRIPTION OF THE EMBODIMENTS

Figure 1:
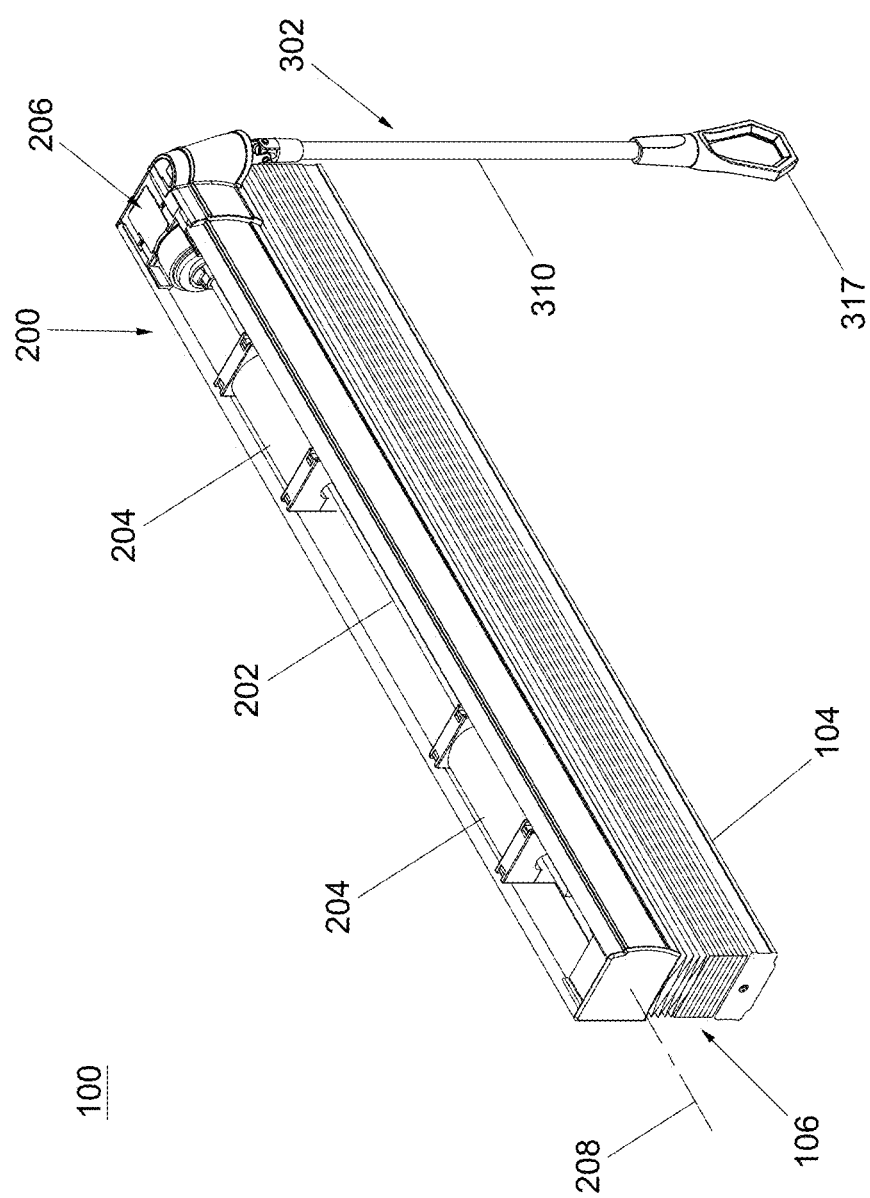
FIG. 1 is a perspective view illustrating an embodiment of a window shade.
Figure 2:
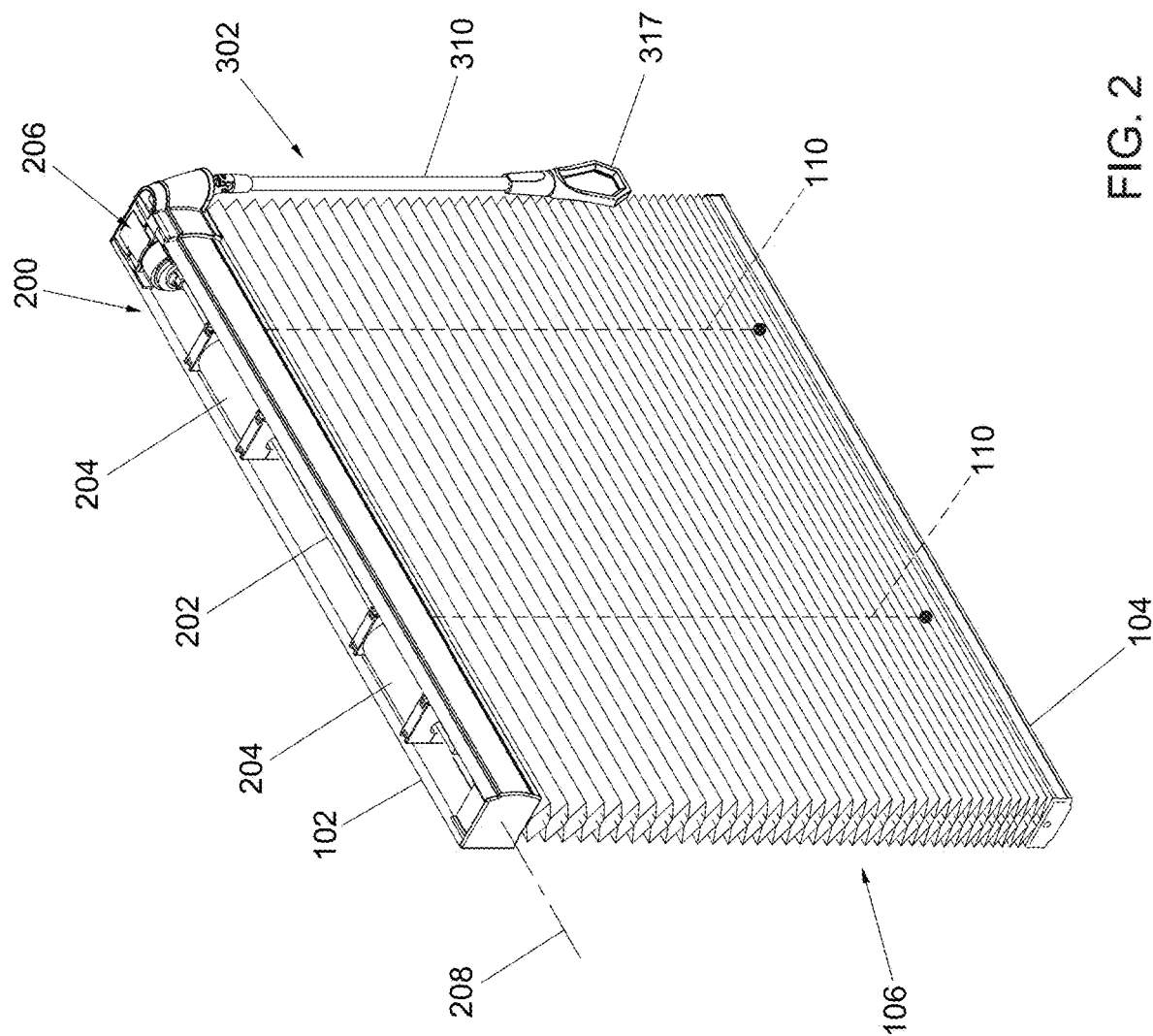
FIG. 2 is a perspective view illustrating the window shade of FIG. 1 having a movable rail lowered from a head rail.

FIGS. 1 and 2 are perspective views illustrating an embodiment of a window shade 100 in different states. Referring to FIGS. 1 and 2, the window shade 100 can include a head rail 102, a movable rail 104, a shading structure 106 and an actuating system 200. The window shade 100 is shown in a retracted or raised state in FIG. 1, and in an expanded or lowered state in FIG. 2.

The head rail 102 may be affixed at a top of a window frame, and can have any desirable shapes. According to an example of construction, the head rail 102 can have an elongate shape including a cavity for at least partially receiving the actuating system 200 of the window shade 100.

The movable rail 104 can be suspended from the head rail 102 with a plurality of suspension elements 110 (shown with phantom lines in FIG. 2). According to an example of construction, the movable rail 104 may be an elongate rail having a channel adapted to receive to the attachment of the shading structure 106. Examples of the suspension elements 110 may include, without limitation, cords, strips, bands, and the like. According to an example, the movable rail 104 may be a bottom rail of the window shade 100. However, it will be appreciated that other shade elements may be provided below the movable rail 104 as needed.

The shading structure 106 is disposed between the head rail 102 and the movable rail 104, and may have any suitable structure that can be expanded and collapsed between the head rail 102 and the movable rail 104. According to an example of construction, the shading structure 106 can have a cellular structure, which may include, without limitation, honeycomb structures. During use, the shading structure 106 can be suspended from the head rail 102, and can be expanded or collapsed by displacing the movable rail 104 away from or toward the head rail 102.

Referring to FIGS. 1 and 2, the movable rail 104 can move vertically relative to the head rail 102 for setting the window shade 100 to a desirable configuration. For example, the movable rail 104 may be raised toward the head rail 102 to collapse the shading structure 106 as shown in FIG. 1, or lowered away from the head rail 102 to expand the shading structure 106 as shown in FIG. 2. The vertical position of the movable rail 104 relative to the head rail 102 may be controlled with the actuating system 200.

Referring to FIGS. 1 and 2, the actuating system 200 is assembled with the head rail 102, and is operable to displace the movable rail 104 relative to the head rail 102 for adjustment. The actuating system 200 can include a transmission axle 202, a plurality of winding units 204 rotationally coupled to the transmission axle 202, and a control module 206 coupled to the transmission axle 202.

The transmission axle 202 and the winding units 204 can be assembled with the head rail 102. The transmission axle 202 is coupled to the winding units 204, and can rotate about a longitudinal axis 208 of the transmission axle 202. Each of the winding units 204 is connected to the movable rail 104 via at least one suspension element 110, and is operable to wind the suspension element 110 for raising the movable rail 104 and to unwind the suspension element 110 for lowering the movable rail 104. For example, the winding unit 204 may include a rotary drum (not shown) that is rotationally coupled to the transmission axle 202 and is connected to one end of the suspension element 110, and another end of the suspension element 110 can be connected to the movable rail 104, whereby the rotary drum can rotate along with the transmission axle 202 to wind or unwind the suspension element 110. Since the winding units 204 are commonly coupled to the transmission axle 202, the winding units 204 can operate in a concurrent manner for winding and unwinding the suspension elements 110.

The control module 206 is coupled to the transmission axle 202, and is operable to cause the transmission axle 202 to rotate in either direction about the longitudinal axis 208 for raising or lowering the movable rail 104. In conjunction with FIGS. 1 and 2, FIG. 3 is an exploded view illustrating a construction of the control module 206, and FIG. 4 is a partial cross-sectional view of the control module 206.

Referring to FIGS. 1-4, the control module 206 can include a housing 210 that can be affixed to the head rail 102. The housing 210 can have a cavity 210A adapted to receive at least some component parts of the control module 206. According to an example of construction, the housing 210 may include two casing portions 212A and 212B that are attached to each other to define at least partially the cavity 210A, and a cover 212C and a bracket 212D that may be affixed to the casing portion 212A to close the cavity 210A at one side thereof.

Figure 3:
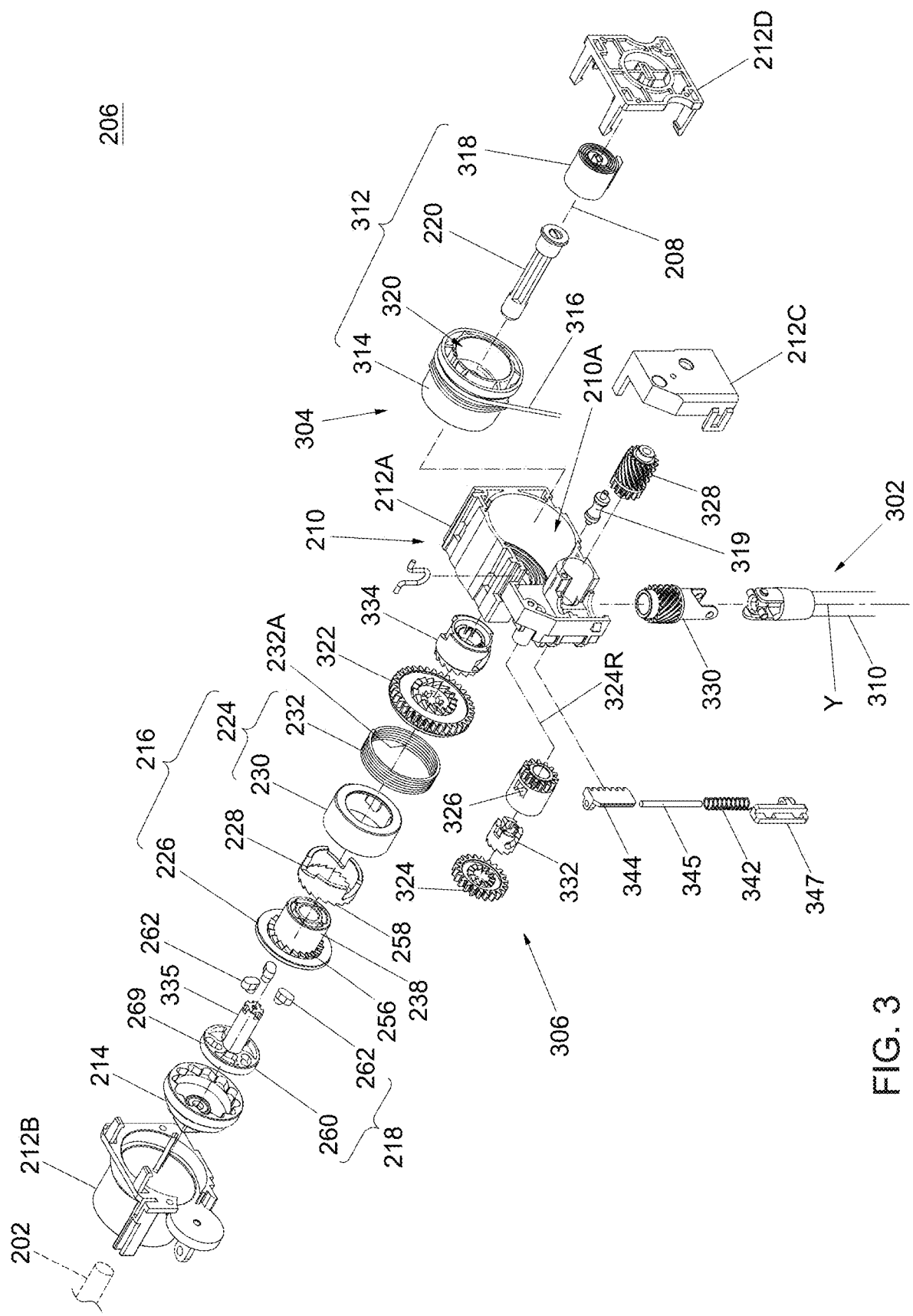
FIG. 3 is an exploded view illustrating the construction of a control module provided in an actuating system for a window shade.
Figure 4:
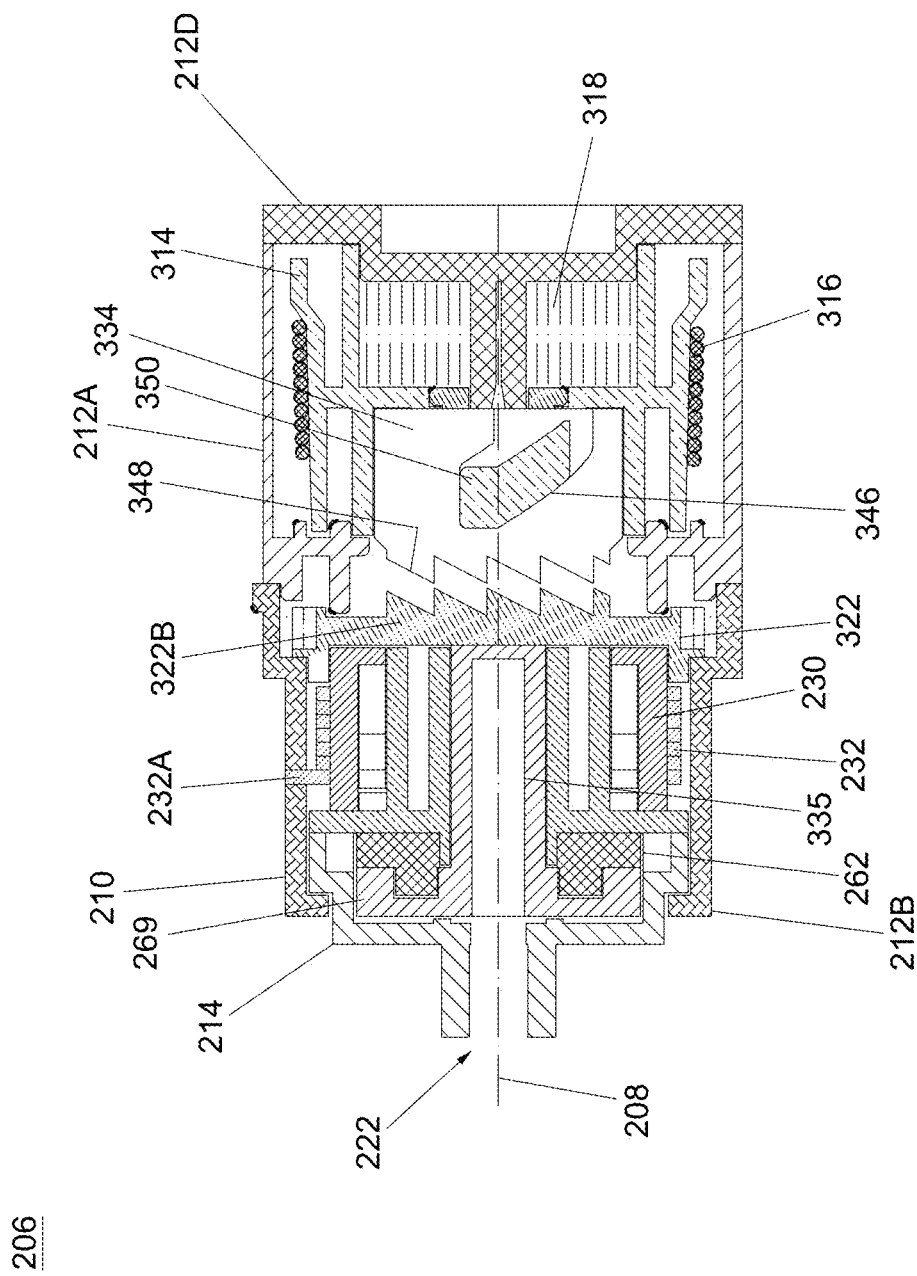
FIG. 4 is a partial cross-sectional view of the control module shown in FIG. 3.

Referring to FIGS. 3 and 4, the control module 206 can include an axle adapter 214, a brake assembly 216, a clutch 218, two operating devices 302 and 304 and a transmission assembly 306, all of which can be assembled with the housing 210.

For facilitating the assembly of the different component parts, the housing 210 can include a shaft portion 220 fixedly connected to the bracket 212D. The shaft portion 220 can be substantially coaxial to the longitudinal axis 208. The shaft portion 220 may be attached to or formed integrally with the bracket 212D.

Referring to FIGS. 3 and 4, the axle adapter 214 can be received at least partially inside the cavity 210A of the housing 210, and can extend outward through the casing portion 212B. According to an example of construction, the axle adapter 214 may be provided as a unitary part. The axle adapter 214 may be pivotally connected to the housing 210 for rotation about the longitudinal axis 208.

The axle adapter 214 is rotationally coupled to the transmission axle 202 so that the transmission axle 202 and the axle adapter 214 can rotate in unison about the longitudinal axis 208 relative to the housing 210. For example, an end of the transmission axle 202 can be inserted into a hole 222 provided in the axle adapter 214. A fastener (not shown) may be used to securely attach the transmission axle 202 to the axle adapter 214. Accordingly, the axle adapter 214 can be rotationally coupled to the winding units 204 via the transmission axle 202, and the transmission axle 202 and the axle adapter 214 can rotate in unison about the longitudinal axis 208 for raising and lowering the movable rail 104.

In conjunction with FIGS. 3 and 4, FIGS. 5 and 6 are respectively an exploded view and a cross-sectional view illustrating a portion of the brake assembly 216 and the clutch 218. Referring to FIGS. 3-6, the brake assembly 216 includes an arrester 224, a rotary element 226 rotatable about the longitudinal axis 208, and a shift collar 228 configured to couple the rotary element 226 to the arrester 224 and decouple the rotary element 226 from the arrester 224.

Referring to FIGS. 3-6, the arrester 224 is configured to provide a braking force adapted to prevent rotation of the transmission axle 202 and the axle adapter 214. The arrester 224 can include a brake engaging part 230 and a braking spring 232 that are disposed around the longitudinal axis 208. The brake engaging part 230 can be integrally formed as a single body having a hollow interior 234 and an outer surface 236. The outer surface 236 may have a generally cylindrical shape.

The braking spring 232 can have at least one end 232A anchored to the housing 210, and can be disposed around the brake engaging part 230 in contact with the outer surface 236 thereof. For example, the braking spring 232 can include a torsion spring mounted around the brake engaging part 230 in frictional contact with the outer surface 236. The braking spring 232 can tighten and apply a braking force on the brake engaging part 230 for preventing rotation of the brake engaging part 230 about the longitudinal axis 208. During operation, the arrester 224 can remain generally stationary, and the braking force applied by the braking spring 232 is adapted to prevent rotation of the transmission axle 202 and the axle adapter 214.

Referring to FIGS. 3-6, the rotary element 226 is disposed inside the cavity 210A of the housing 210, and is rotatable about the longitudinal axis 208. The rotary element 226 can include a shaft portion 238, and a flange 240 protruding from a circumference of the shaft portion 238 at an end thereof. The rotary element 226 can be disposed adjacent to the arrester 224, and the shaft portion 238 of the rotary element 226 can extend through the hollow interior 234 of the brake engaging part 230.

Referring to FIGS. 3-6, the shift collar 228 is configured to move between a coupling position where the rotary element 226 is operatively coupled to the arrester 224 through the shift collar 228, and a decoupling position where the rotary element 226 is operatively decoupled from the arrester 224. When the rotary element 226 is coupled to the arrester 224, the braking force applied by the braking spring 232 can prevent rotation of the rotary element 226. When the rotary element 226 is decoupled from the arrester 224, the rotary element 226 is rotatable relative to the arrester 224 free of the braking force applied by the braking spring 232.

The shift collar 228 is not limited to any specific shapes, and may have any structures extending at least partially around the longitudinal axis 208. For example, a portion of the shift collar 228 may include a cylindrical shape or a portion of a cylinder. According to an example of construction, the shift collar 228 is coupled to the arrester 224, and is movable along the longitudinal axis 208 relative to the arrester 224 between the coupling position where the shift collar 228 is engaged with the rotary element 226 and the decoupling position where the shift collar 228 is disengaged from the rotary element 226. For example, the shift collar 228 can be disposed around the shaft portion 238 of the rotary element 226, and can be in sliding contact with the shaft portion 238 and the brake engaging part 230 inside the hollow interior 234 thereof. The shift collar 228 can be disposed so as to be rotatable about and slidable along the shaft portion 238 of the rotary element 226.

Referring to FIGS. 3-6, the shift collar 228 can be configured to switch from the decoupling position to the coupling position in response to a rotation of the rotary element 226 in a direction R1, and to switch from the coupling position to the decoupling position in response to a rotation of the rotary element 226 in another direction R2 opposite to the direction R1. According to an example of construction, the shift collar 228 can be in sliding contact with the arrester 224 via at least one ramp surface provided on the shift collar 228 and/or the arrester 224. For example, the shift collar 228 can have a notch 242 disposed eccentric from the longitudinal axis 208, and an inner wall 244 of the brake engaging part 230 at least partially delimiting the hollow interior 234 thereof can have a protrusion 246 that is restricted to move within the notch 242. The notch 242 of the shift collar 228 can include a ramp surface 248 extending between two stop surfaces 250A and 250B, the protrusion 246 of the brake engaging part 230 can have a ramp surface 252 extending between two stop surfaces 254A and 254B, and the ramp surface 248 can be in sliding contact with the ramp surface 252. This connection allows a limited displacement of the shift collar 228 relative to the brake engaging part 230.

During operation, the protrusion 246 of the brake engaging part 230 can be displaced between the two stop surfaces 250A and 250B of the notch 242 during the movement of the shift collar 228 relative to the brake engaging part 230. More specifically, owing to the sliding contact between the ramp surface 248 of the shift collar 228 and the ramp surface 252 of the brake engaging part 230 and a frictional contact between the shaft portion 238 of the rotary element 226 and the shift collar 228, a rotational displacement of the rotary element 226 in the direction R1 can cause the shift collar 228 to rotate and slide in a direction D1 from the decoupling position to the coupling position so that the rotary element 226 is coupled to the brake engaging part 230 via the shift collar 228.

Referring to FIGS. 3-6, the rotary element 226 can include a plurality of teeth 256 disposed around the longitudinal axis 208, and the shift collar 228 can include a plurality of teeth 258 disposed around the longitudinal axis 208. The teeth 258 of the shift collar 228 can be engaged with the teeth 256 of the rotary element 226 when the shift collar 228 is in the coupling position, and can be disengaged from the teeth 256 of the rotary element 226 when the shift collar 228 is in the decoupling position. The teeth 256 may be exemplarily provided on the flange 240 around the shaft portion 238 of the rotary element 226. The teeth 258 may be disposed along a circular edge of the shift collar 228 that extends around the shaft portion 238 facing the teeth 256 of the rotary element 226.

The teeth 256 and 258 may have a saw-tooth pattern. When the shift collar 228 is in the coupling position, the engagement between the teeth 256 and 258 allows torque transmission from the rotary element 226 to the shift collar 228 in only one direction R1 and allows rotation of the rotary element 226 relative to the shift collar 228 in the direction R2 opposite to the direction R1. The direction R1 can correspond to a direction of rotation of the transmission axle 202 and the axle adapter 214 for lowering the movable rail 104, and the direction R2 can correspond to a direction of rotation of the transmission axle 202 and the axle adapter 214 for raising the movable rail 104. A torque in the direction R1 may be created by the suspended load of the movable rail 104, and may cause a rotation in the direction R1 that would move the stop surface 250A of the shift collar 228 toward the stop surface 254A of the brake engaging part 230. When the shift collar 228 is in the coupling position, the rotary element 226 and the shift collar 228 are rotationally coupled to each other, and the braking force applied by the braking spring 232 on the brake engaging part 230 is adapted to prevent a rotation of the rotary element 226 and the shift collar 228 in the direction R1 via a contact between the stop surface 250A of the shift collar 228 and the stop surface 254A of the brake engaging part 230. The braking force of the braking spring 232 thus can oppose a torque in the direction R1 to hold the movable rail 104 in position. When the rotary element 226 rotates in the direction R2, the configuration of the teeth 256 and 258 is so that the rotary element 226 can push the shift collar 228 to move away in a direction D2 opposite to the direction D1, whereby the shift collar 228 can switch from the coupling position to the decoupling position.

Referring to FIGS. 3-6, the clutch 218 is configured to couple and decouple the axle adapter 214 from the rotary element 226. More specifically, the clutch 218 has a clutch coupling state and a clutch decoupling state, wherein the clutch 218 couples the axle adapter 214 to the rotary element 226 in the clutch coupling state and decouples the axle adapter 214 from the rotary element 226 in the clutch decoupling state. The clutch 218 includes a clutch actuator 260 that is operable to switch the clutch 218 between the clutch coupling state and the clutch decoupling state.

According to an example of construction, the clutch 218 can include a plurality of clutching elements 262 that are movably linked to the clutch actuator 260, and the clutch actuator 260 is rotatable about the longitudinal axis 208 to cause the clutching elements 262 to engage with and disengage from the axle adapter 214. The clutching elements 262 can be engaged with the axle adapter 214 in the clutch coupling state, and disengaged from the axle adapter 214 in the clutch decoupling state. According to an example of construction, the axle adapter 214 can have a sleeve 264 provided with a plurality of teeth 266 protruding inward from an inner wall of the sleeve 264, and the clutching elements 262 are engageable with any of the teeth 266 in the clutch coupling state.

In conjunction with FIGS. 3-6, FIG. 7 is a planar view illustrating further construction details of the clutch 218 in a plane perpendicular to the longitudinal axis 208. Referring to FIGS. 3-7, the clutching elements 262 can be coupled to the rotary element 226 so that the clutching elements 262 are movable along with the rotary element 226 around the longitudinal axis 208.

According to an example of construction, the rotary element 226 can have a plurality of channels 268 that are disposed at different angular positions distant from the longitudinal axis 208 and opened on a circumference of the rotary element 226, and the clutching elements 262 can be respectively guided for sliding along the channels 268. The channels 268 may be exemplarily provided in the rotary element 226 at a side of the flange 240 opposite to that of the shaft portion 238. Each of the clutching elements 262 may be exemplarily formed as a single part including an elongate portion 262A and a pin 262B protruding from the elongate portion 262A. The elongate portions 262A of the clutching elements 262 can be respectively guided for sliding along the channels 268. The clutching elements 262 can thereby slide relative to the rotary element 226 generally orthogonal to the longitudinal axis 208 to protrude outward from the circumference of the rotary element 226 for engaging with the teeth 266 of the sleeve 264 or retract toward the interior of the rotary element 226 for disengaging from the teeth 266 of the sleeve 264.

Figure 7:
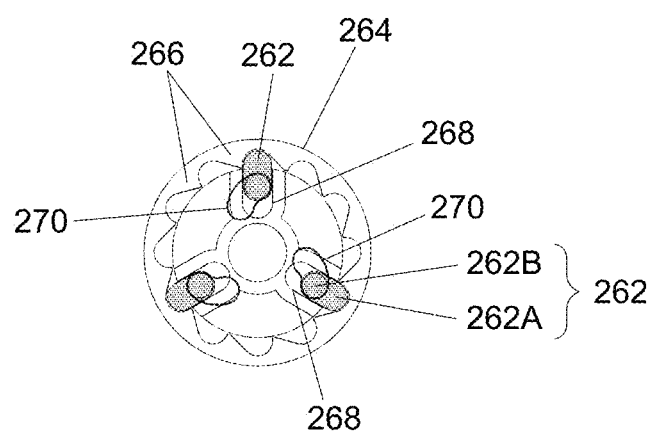
FIG. 7 is a planar view illustrating the clutch in a clutch coupling state.
Figure 8:
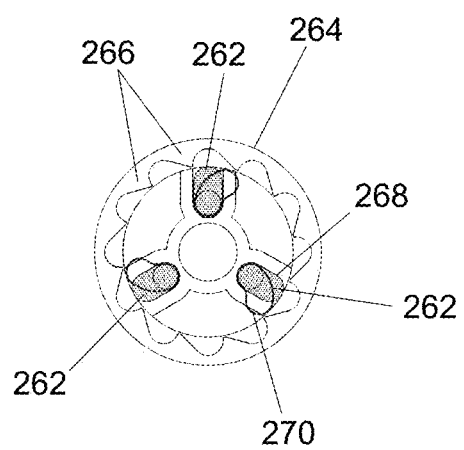
FIG. 8 is a planar view illustrating the clutch in a clutch decoupling state.

Referring to FIGS. 3-7, the clutching elements 262 are movably linked to the clutch actuator 260 so that the clutch actuator 260 is rotatable about the longitudinal axis 208 to urge the clutching elements 262 to move for engaging with or disengaging from the sleeve 264 of the axle adapter 214. According to an example of construction, the clutch actuator 260 can have a plate 269 provided with a plurality of guide slots 270, and the pins 262B of the clutching elements 262 can be respectively connected slidably to the guide slots 270. The guide slots 270 can respectively overlap with the channels 268, and the mutually-overlapping guide slot 270 and channel 268 can extend in different directions. In this manner, the rotation of the clutch actuator 260 in either direction can urge the clutching elements 262 to concurrently slide relative to the rotary element 226 for engaging with or disengaging from the axle adapter 214. FIG. 7 shows the clutching elements 262 engaged with the axle adapter 214 corresponding to the clutch coupling state, and FIG. 8 shows the clutching elements 262 disengaged from the axle adapter 214 corresponding to the clutch decoupling state.

With the construction described herein, the clutch actuator 260 is rotatable along with the axle adapter 214 and the rotary element 226 when the clutch 218 is in the clutch coupling state. Accordingly, the clutch actuator 260 can be actuated to urge the rotary element 226 to rotate in the direction R1 and cause the shift collar 228 to move from the decoupling position to the coupling position, whereby the rotary element 226 can be coupled to the brake engaging part 230 via the shift collar 228. When the shift collar 228 is in the coupling position and the clutch 218 is in the clutch coupling state, the braking force applied by the arrester 224 can be exerted through the clutching elements 262 to the axle adapter 214 so that the axle adapter 214 and the transmission axle 202 can be prevented from rotating in the direction R1.

Figure 5:
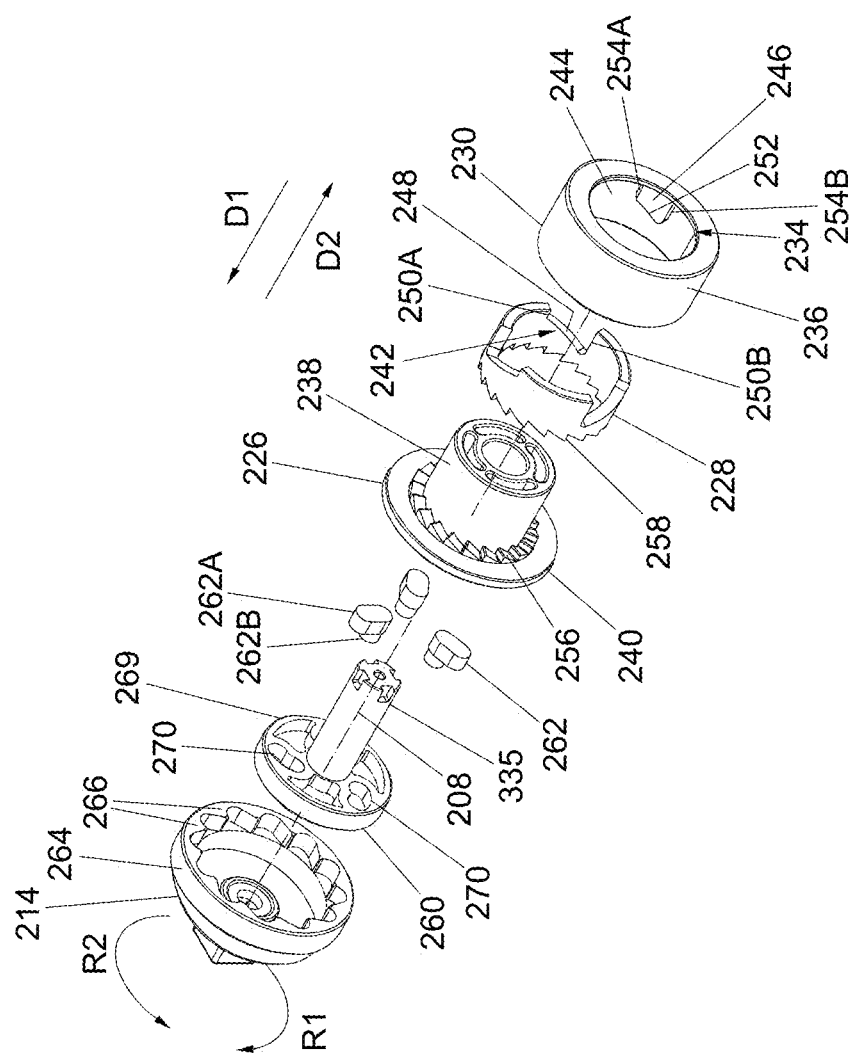
FIGS. 5 and 6 are respectively an exploded view and a cross-sectional view illustrating a portion of a brake assembly and a clutch provided in the control module shown in FIG. 3.
Figure 6:
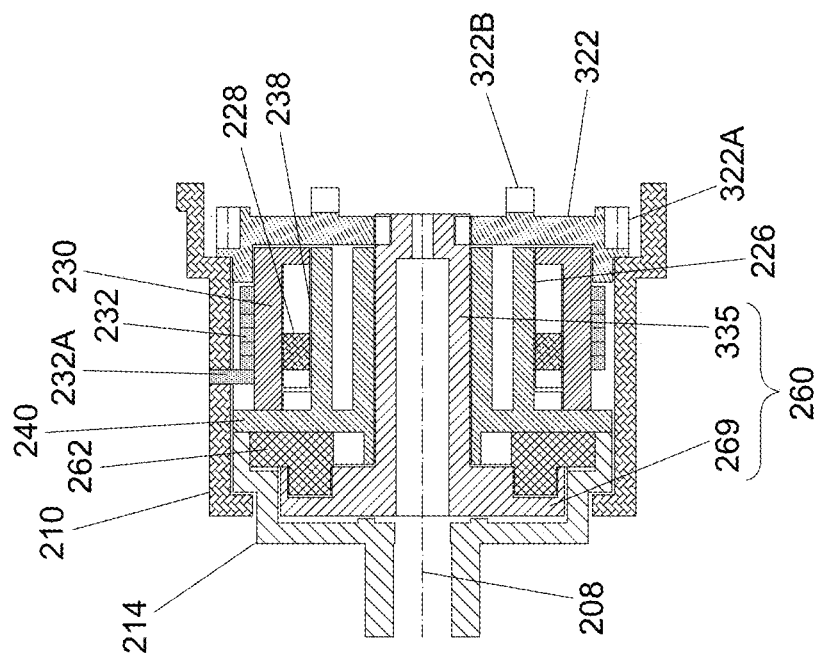

Referring to FIGS. 3-5, the transmission assembly 306 is configured to selectively couple the operating device 302 or 304 to the clutch actuator 260 so that each of the two operating devices 302 and 304 is independently operable by a user to actuate the clutch actuator 260. For example, the operating device 302 is operable to urge the clutch actuator 260 to rotate for switching the clutch 218 from the clutch coupling state to the clutch decoupling state while the operating device 304 is operatively decoupled from the clutch actuator 260, and the operating device 304 is operable to urge the clutch actuator 260 to rotate for switching the clutch 218 from the clutch decoupling state to the clutch coupling state while the operating device 302 is operatively decoupled from the clutch actuator 260. In particular, while the shift collar 228 is in the coupling position, the operating device 302 is operable to urge the clutch actuator 260 to rotate for switching the clutch 218 from the clutch coupling state to the clutch decoupling state so that the axle adapter 214 and the transmission axle 202 are rotatable relative to the rotary element 226 and the arrester 224 in the direction R1. Moreover, the operating device 304 is operable to urge the clutch actuator 260 to rotate for switching the clutch 218 from the clutch decoupling state to the clutch coupling state so that the rotary element 226 can rotate along with the axle adapter 214 and the transmission axle 202 in the direction R2 for switching the shift collar 228 from the coupling position to the decoupling position.

Referring to FIGS. 1-3, the operating device 302 can include a wand 310 having a lengthwise axis Y, and the operating device 304 can include a lift actuating module 312. Each of the wand 310 and the lift actuating module 312 is independently operable to actuate the clutch actuator 260.

Referring to FIGS. 1-3, the lift actuating module 312 can include a spool 314 connected to an operating part 316, and a spring 318 connected to the spool 314. The operating part 316 can be a flexible element of a linear shape, and can have an end anchored to the spool 314. Examples of the operating part 316 can include, without limitation, a cord or a tape. The spool 314 is pivotally connected to the housing 210, and is rotatable about the longitudinal axis 208 in a winding direction to wind the operating part 316 and in an unwinding direction to unwind the operating part 316. The operating part 316 may be threaded through a hollow interior of the wand 310, and may have another end anchored to a handle 317. The handle 317 is disposed adjacent to a distal end of the wand 310, and can be pulled away from the wand 310 for extending the operating part 316 from the spool 314. A guide element 319 may be provided inside the housing 210 for guiding the operating part 316.

The spring 318 is connected to the spool 314, and is adapted to bias the spool 314 to rotate in the winding direction. According to an example of construction, the spool 314 can have a cavity 320 through which passes the shaft portion 220, and the spring 318 can be disposed around the shaft portion 220 inside the cavity 320 with two ends of the spring 318 being respectively connected to the shaft portion 220 and the spool 314. The lift actuating module 312 may be operable to raise the movable rail 104 by pulling the operating part 316 so that the spool 314 rotates in the unwinding direction. When the operating part 316 is released, the spring 318 can urge the spool 314 to rotate for winding at least partially the operating part 316.

Referring to FIGS. 3-6, the transmission assembly 306 can include a plurality of gears 322, 324, 326, 328 and 330, and two clutching elements 332 and 334. The transmission assembly 306 can be adapted to an embodiment in which the wand 310 is rotatable about the lengthwise axis Y for actuating the clutch actuator 260. The wand 310 can be coupled to the clutch actuator 260 through the gears 322, 324, 326, 328 and 330 and the clutching element 332. The lift actuating module 312 can be coupled to the clutch actuator 260 through the gear 322 and the clutching element 334.

Figure 9:
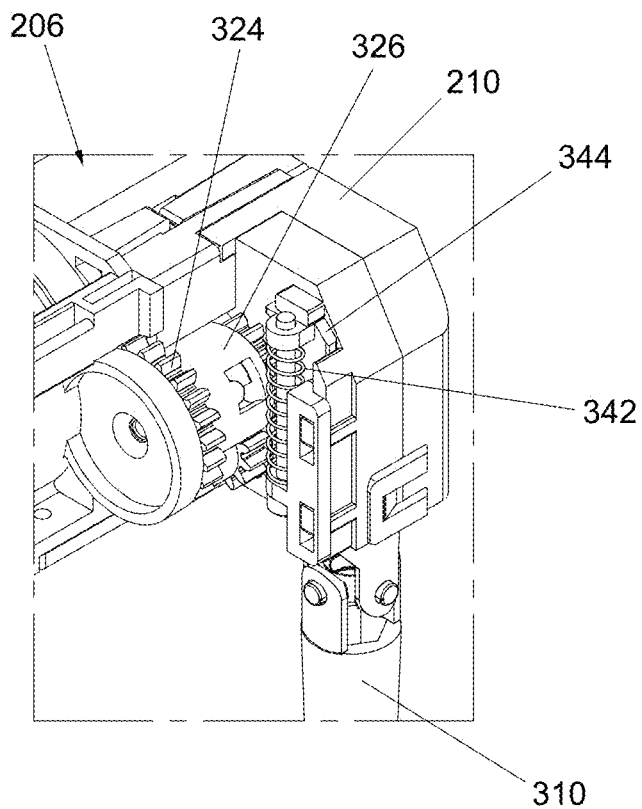
FIG. 9 is an enlarged perspective view illustrating a portion of the control module.
Figure 10:
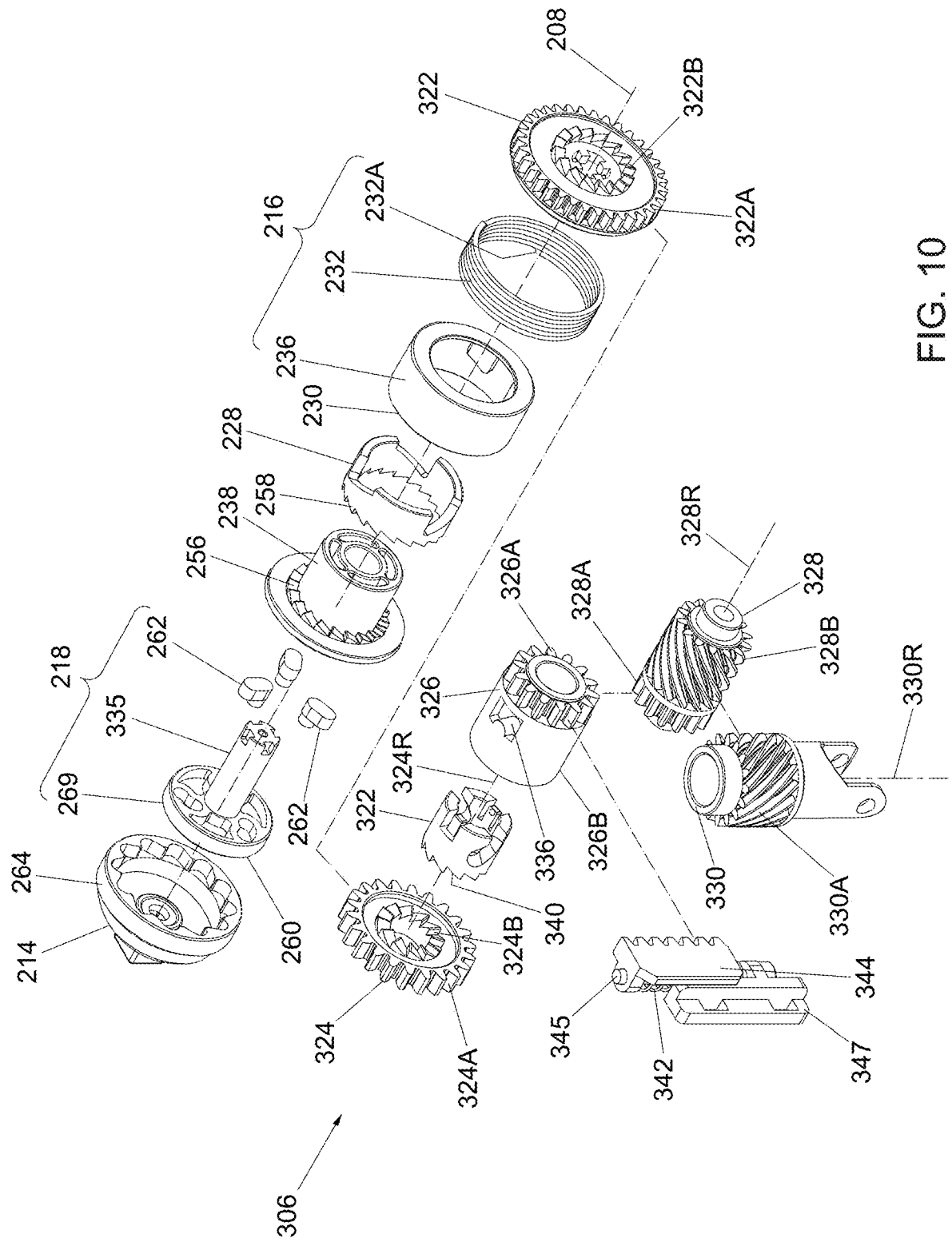
FIG. 10 is an exploded view illustrating the arrangement of a brake assembly, the clutch and a transmission assembly in the control module.

In conjunction with FIGS. 3-6, FIG. 9 is an enlarged perspective view illustrating a portion of the control module 206, and FIG. 10 is an exploded view illustrating the arrangement of the brake assembly 216, the clutch 218 and the transmission assembly 306. Referring to FIGS. 3-5, 9 and 10, the gear 322 can have two sets of teeth 322A and 322B, and can be rotationally locked to the clutch actuator 260 so that the gear 322 and the clutch actuator 260 are rotatable in unison about the longitudinal axis 208. For example, the clutch actuator 260 can have a rod 335 fixedly connected to the plate 269 at one end, and the gear 322 can be rotationally coupled to the other end of the rod 335. The gear 322 may be disposed adjacent to a side of the brake engaging part 230, and the rod 335 can extend along the longitudinal axis 208 through the rotary element 226 and the brake engaging part 230 for connection to the gear 322. The teeth 322A can be disposed along an outer circumference of the gear 322, and the teeth 322B can be disposed along an inner circumference of the gear 322 on a face thereof oriented opposite to the brake engaging part 230.

The gear 324 can have two sets of teeth 324A and 324B, and can be pivotally connected to the housing 210 about a pivot axis 324R parallel to the longitudinal axis 208. The teeth 324A can be disposed along an outer circumference of the gear 324, and the teeth 324B can be disposed on a face of the gear 324 along an inner circumference thereof. The gear 324 is disposed so that the teeth 324A thereof are meshed with the teeth 322A of the gear 322, and the teeth 324B of the gear 324 and the teeth 322B of the gear 322 face a same direction.

The gear 326 can have a set of teeth 326A and a sleeve 326B, the sleeve 326B being provided with a protrusion 336 protruding inward. The gear 326 is pivotally connected to the housing 210 about the same pivot axis 324R of the gear 324.

The gear 328 has two sets of teeth 328A and 328B, and is pivotally connected to the housing 210 about a pivot axis 328R parallel to the pivot axis 324R. The two sets of teeth 328A and 328B can be disposed around the pivot axis 328R. The gear 328 is disposed so that the teeth 328A thereof are meshed with the teeth 326A of the gear 326.

The gear 330 has a set of teeth 330A, is pivotally connected to the housing 210 about a pivot axis 330R orthogonal to the pivot axes 324R and 328R, and is pivotally connected to the wand 310. The gear 330 is disposed so that the teeth 330A thereof are meshed with the teeth 328B of the gear 328. The pivotal connection between the wand 310 and the gear 330 allows to modify the inclination of the wand 310 for facilitating its operation.

In conjunction with FIGS. 3, 9 and 10, FIGS. 11 and 12 are partial cross-sectional views illustrating the assembly and operation of the clutching element 332. Referring to FIGS. 3 and 9-12, the clutching element 332 is movable to engage with and disengage from the gear 324 for coupling and decoupling the operating device 302 from the clutch actuator 260. More specifically, the clutching element 332 may be movably linked to the wand 310, and is movable to engage with and disengage from the teeth 324B of the gear 324 for coupling and decoupling the wand 310 from the clutch actuator 260.

Figure 11:
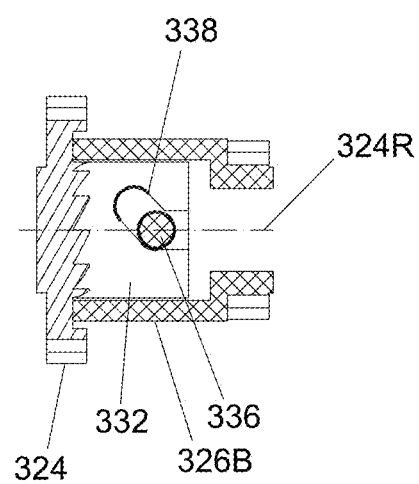
FIGS. 11 and 12 are partial cross-sectional views illustrating the assembly and operation of a clutching element operable to couple and decouple an operating device from the clutch.
Figure 12:
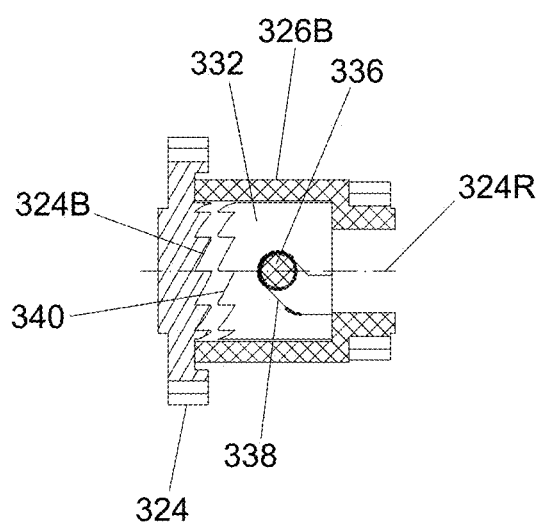

According to an example of construction, the clutching element 332 can have an outer surface provided with a guide slot 338 tilted an angle relative to the pivot axis 324R, and an end provided with a set of teeth 340. The clutching element 332 can be disposed for sliding along and rotating about the pivot axis 324R of the gear 324, and can be received at least partially inside the sleeve 326B of the gear 326 so that the protrusion 336 can be slidably connected to the guide slot 338. With this construction, the wand 310 is operable in one direction to urge the clutching element 332 to move for engaging the teeth 340 of the clutching element 332 with the teeth 324B of the gear 324, and is operable in an opposite direction to urge the clutching element 332 to move for disengaging the teeth 340 from the teeth 324B of the gear 324. The wand 310 is coupled to the clutch actuator 260 when the clutching element 332 is engaged with the gear 324 (as shown in FIG. 11), and is decoupled from the clutch actuator 260 when the clutching element 332 is disengaged from the gear 324 (as shown in FIG. 12).

With the construction described herein, the wand 310 is movably linked to the clutching element 332, and is operable to cause the clutching element 332 to move for engaging with or disengaging from the gear 324. For example, the wand 310 can move from an initial state to an actuating state to cause the clutching element 332 to move for engaging with the gear 324, and can move reversely from the actuating state to the initial state as the clutching element 332 moves for disengaging from the gear 324.

In the example of FIGS. 3, 9 and 10, the wand 310 is rotatable about the lengthwise axis Y between the initial state and the actuating state. According to another example of construction described further below, the wand 310 may alternatively be configured to slide between the initial state and the actuating state to cause the clutching element 332 to move for engaging with the gear 324.

Referring to FIGS. 3 and 9-12, a biasing spring 342 can be provided to assist the clutching element 332 in disengaging from the gear 324. For example, the teeth 326A of the gear 326 can be engaged with a toothed element 344 that is movably connected to the housing 210, and the biasing spring 342 can be connected to the housing 210 and the toothed element 344. According to an example of construction, the housing 210 may have a fixed mount 347 that is fixedly connected to one end of a guide rod 345, the toothed element 344 may be slidably connected to the guide rod 345, and the biasing spring 342 can be disposed around the guide rod 345 with two ends of the biasing spring 342 respectively connected to the fixed mount 347 and the toothed element 344. When the wand 310 is released in the actuating state, the spring force of the biasing spring 342 can urge the toothed element 344 to move, which results in a rotational displacement of the gear 326 in a direction that urges the clutching element 332 to disengage from the gear 324 and causes the wand 310 to recover the initial state.

Referring to FIGS. 1-4, the clutching element 334 is movable to engage with and disengage from the gear 322 for coupling and decoupling the operating device 304 from the clutch actuator 260. More specifically, the clutching element 334 may be movably linked to the spool 314 of the lift actuating module 312, and is movable to engage with and disengage from the teeth 322B of the gear 322 for coupling and decoupling the lift actuating module 312 from the clutch actuator 260.

According to an example of construction, the clutching element 334 can have an outer surface provided with a guide slot 346, and an end provided with a set of teeth 348. The clutching element 334 can be disposed for sliding along and rotating about the longitudinal axis 208, and can be received at least partially inside a hollow interior of the spool 314. An inner wall of the spool 314 can have a protrusion 350 protruding inward, which can be slidably connected to the guide slot 346 of the clutching element 334.

Figure 13:
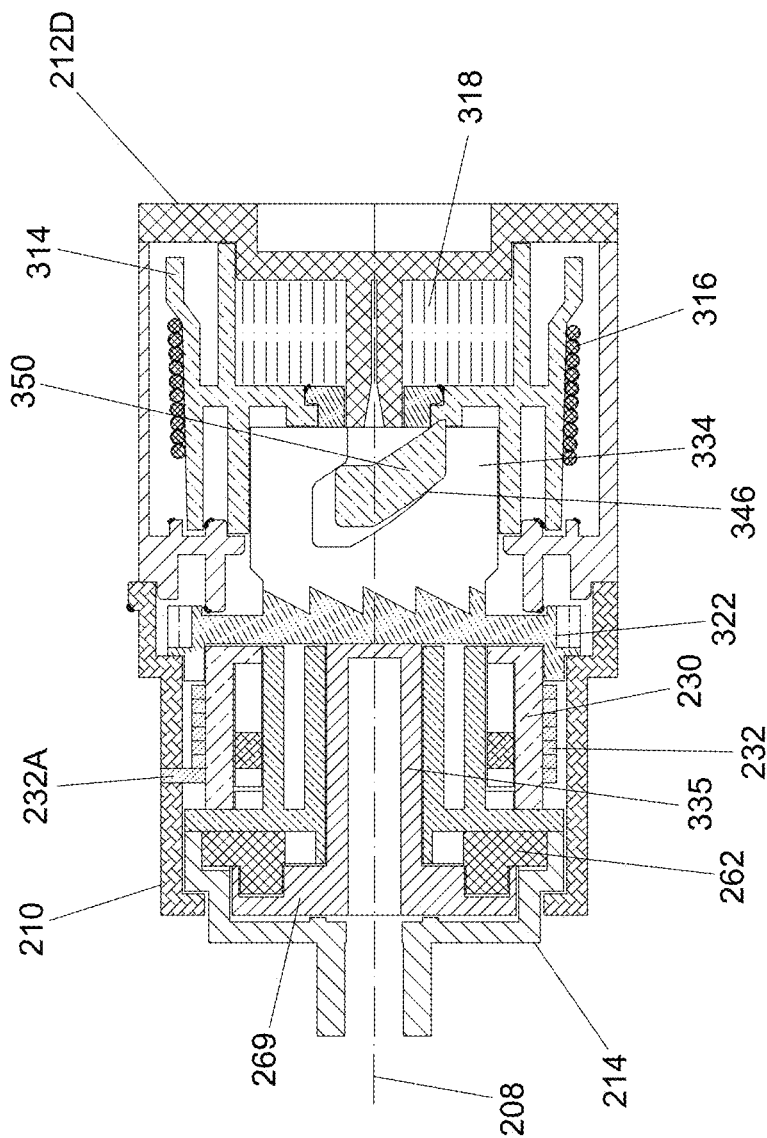
FIG. 13 is a partial cross-sectional view illustrating the assembly and operation of another clutching element operable to couple and decouple another operating device from the clutch.
Figure 14:
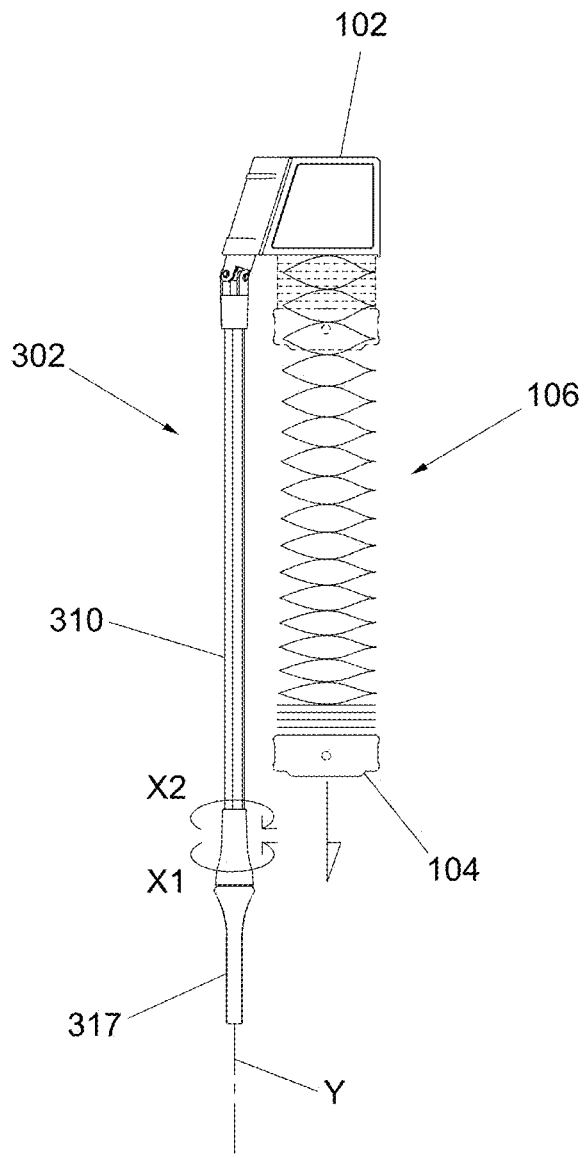
FIGS. 14 and 15 are schematic views illustrating exemplary operation for expanding the window shade of FIG. 1.
Figure 15:
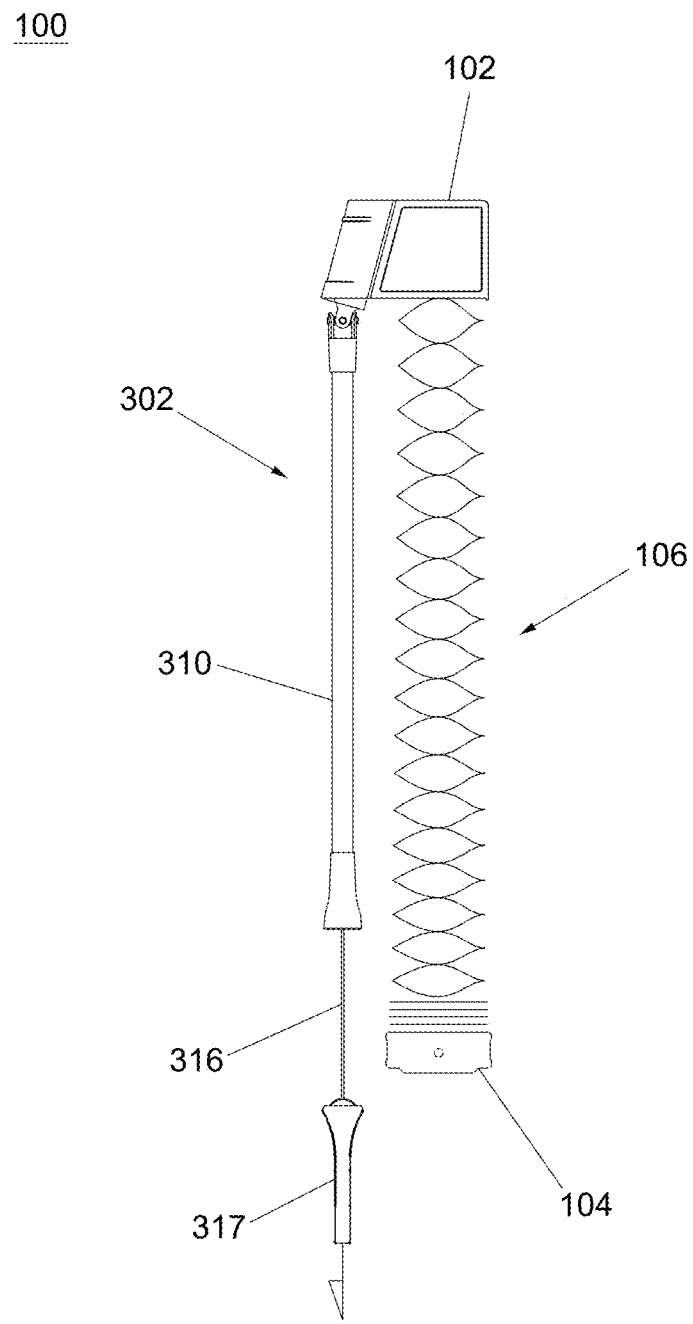
Figure 16:
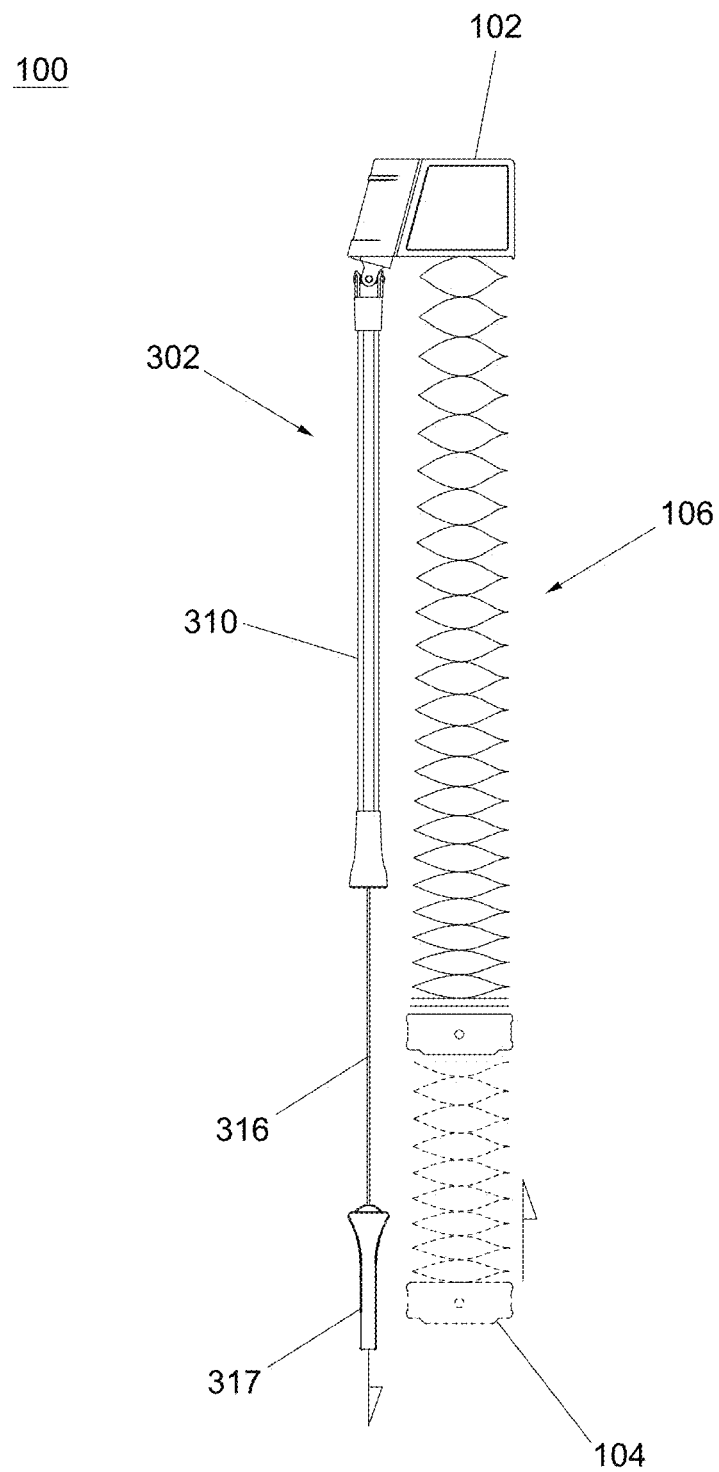
FIGS. 16 and 17 are schematic views illustrating exemplary operation for raising the movable rail of the window shade of FIG. 1.
Figure 17:
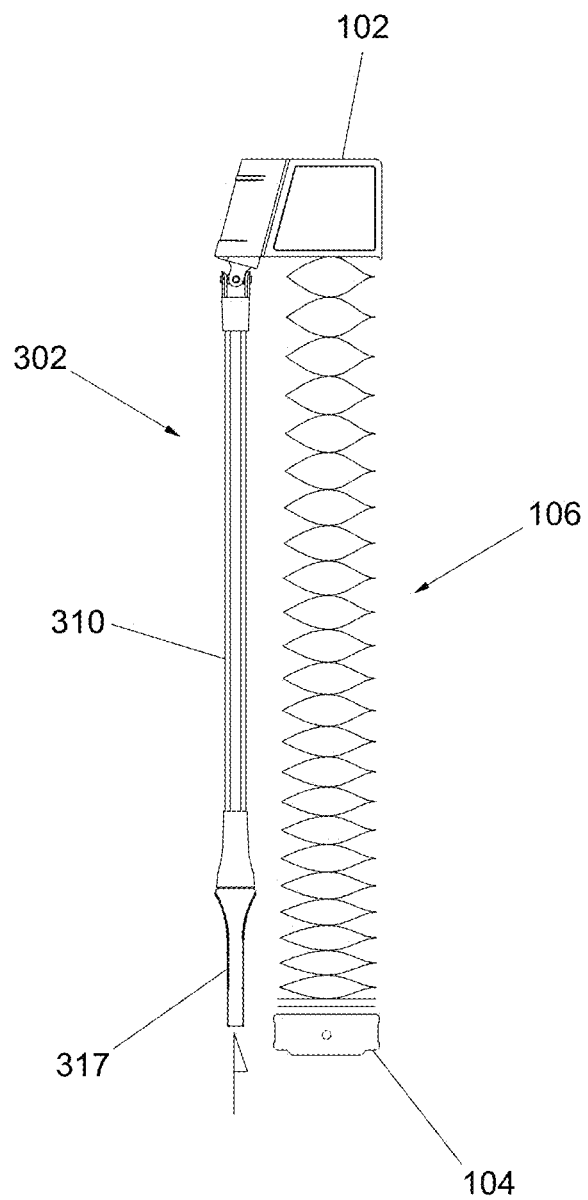

With the construction described herein, the spool 314 is rotatable in the unwinding direction to urge the clutching element 334 to move for engaging the teeth 348 of the clutching element 334 with the teeth 322B of the gear 322, and is rotatable in the winding direction to urge the clutching element 334 to move reversely for disengaging the teeth 348 of the clutching element 334 from the teeth 322B of the gear 322. The unwinding direction of rotation of the spool 314 can correspond to the direction R2 of rotation of the rotary element 226 (shown in FIG. 5) for displacing the shift collar 228 from the coupling position to the decoupling position. The lift actuating module 312 is coupled to the clutch actuator 260 when the clutching element 334 is engaged with the gear 322 (as shown in FIG. 13), and is decoupled from the clutch actuator 260 when the clutching element 334 is disengaged from the gear 322 (as shown in FIG. 4).

The teeth 322B of the gear 322 and the teeth 348 of the clutching element 334 may have a saw-tooth pattern. When the clutching element 334 is engaged with the gear 322, the engagement between the teeth 332B and 348 allows torque transmission from the spool 314 and the clutching element 334 to the clutch actuator 260 in only the unwinding direction (which corresponds to the direction R2 shown in FIG. 5), and allows rotation of the spool 314 and the clutching element 334 relative to the clutch actuator 260 in the winding direction (which corresponds to the direction R1 shown in FIG. 5). The teeth 332B and 348 may be configured so that the clutching element 334 can be urged by the gear 322 to move away for disengaging from the gear 322 in response to a rotation of the clutch actuator 260 and the gear 322 induced by an operation of the operating device 302.

In conjunction with FIGS. 1-13, FIGS. 14 and 15 are schematic views illustrating exemplary operation for expanding the window shade 100 provided with the actuating system 200 described previously. Referring to FIGS. 1 and 3-13, supposing that the movable rail 104 is initially held in position relative to the head rail 102. In this initial state, the clutch 218 is in the clutch coupling state, and the suspended load of the movable rail 104 applies a torque about the longitudinal axis 208 that can keep the shift collar 228 in the coupling position. Accordingly, the braking force of the arrester 224 can prevent rotation of the transmission axle 202, the axle adapter 214 and the rotary element 226 in the direction R1.

Referring to FIGS. 3-13 and 14, when the window shade 100 is to be expanded, a user can rotate the wand 310 about its lengthwise axis Y in one direction X1 from the initial state to the actuating state, and then release the wand 310 so that the biasing spring 342 urges the wand 310 to rotate reversely in the opposite direction X2 from the actuating state to the initial state. The displacement of the wand 310 from the initial state to the actuating state causes the clutch actuator 260 to rotate for switching the clutch 218 from the clutch coupling state to the clutch decoupling state. While the arrester 224 and the rotary element 226 remain stationary and the shift collar 228 remains in the coupling position, the transmission axle 202 and the axle adapter 214 can rotate in the direction R1 for lowering the movable rail 104 under gravity action.

Referring to FIGS. 3-13 and 15, when the movable rail 104 moving downward reaches a desired position, the operating part 316 can be slightly pulled downward with the handle 317 and then can be released. Pulling the operating part 316 downward causes the spool 314 to rotate in the unwinding direction, which couples the lift actuating module 312 to the clutch actuator 260 and urges the clutch actuator 260 to rotate so that the clutch 218 is switched from the clutch decoupling state to the clutch coupling state. Releasing the operating part 316 after it is pulled downward causes the spool 314 to rotate in the winding direction, which decouples the lift actuating module 312 from the clutch actuator 260. Accordingly, the clutch 218 can remain in the clutch coupling state, and the braking force of the arrester 224 can be transferred through the shift collar 228, the rotary element 226 and the clutching elements 262 to the axle adapter 214 and the transmission axle 202 for keeping the movable rail 104 in the desired position.

In conjunction with FIGS. 3-13, FIGS. 16 and 17 are schematic views illustrating exemplary operation for raising the movable rail 104 of the window shade 100 provided with the actuating system 200 described previously. Referring to FIGS. 3-13 and 16, when a user wants to raise the movable rail 104, the operating part 316 can be continuously pulled downward with the handle 317 while the wand 310 remains in the initial state. As a result, the spool 314 rotates in the unwinding direction, which couples the lift actuating module 312 to the clutch actuator 260 and urges the clutch actuator 260 to rotate so that the clutch 218 is switched from the clutch decoupling state to the clutch coupling state. While the clutch 218 is in the clutch coupling state, continuously pulling the operating part 316 downward urges the axle adapter 214 and the rotary element 226 to concurrently rotate in the direction R2 for displacing the shift collar 228 from the coupling position to the decoupling position. Accordingly, the transmission axle 202, the axle adapter 214, the clutch 218 and the rotary element 226 can rotate along with the spool 314 for raising the movable rail 104, while the arrester 224 and the shift collar 228 remain stationary.

Referring to FIGS. 3-13 and 17, the user can release the handle 317 when the movable rail 104 has reached a desired position or when the operating part 316 has extended a maximum length. As a result, the spool 314 rotates for winding the operating part 316 owing to the action of the spring 318, which decouples the lift actuating module 312 from the clutch actuator 260. Accordingly, the clutch 218 can remain in the clutch coupling state, and the suspended load of the movable rail 104 then can urge the axle adapter 214, the clutch 218 and the rotary element 226 to rotate in the direction R1, which causes the shift collar 228 to move from the decoupling position to the coupling position. The braking force of the arrester 224 then can be transferred through the shift collar 228 in the coupling position, the rotary element 226 and the clutching elements 262 to the axle adapter 214 and the transmission axle 202 for keeping the movable rail 104 in position.

The aforementioned actuation and release of the operating part 316 can be repeated multiple times until the movable rail 104 rises to a desired position. The wand 310 can remain in the initial state during the aforementioned operation for raising the movable rail 104.

Figure 18:
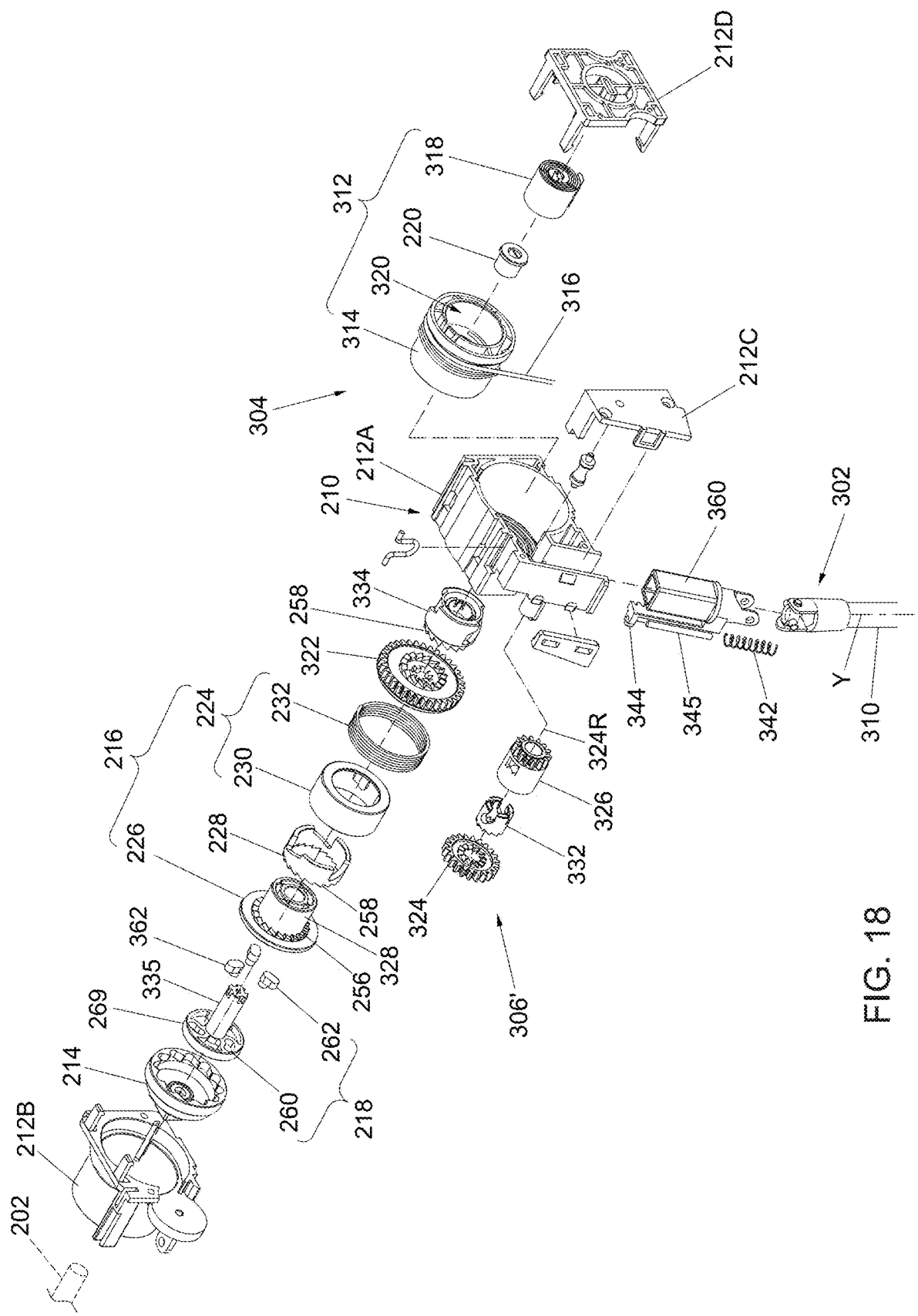
FIG. 18 is an exploded view illustrating a variant construction of a control module provided in an actuating system for a window shade.

FIG. 18 is an exploded view illustrating a variant construction of the control module 206 in which the transmission assembly 306 previously described is replaced with a transmission assembly 306'. Rather than rotating about the lengthwise axis Y, the wand 310 in the embodiment of FIG. 18 is configured to slide vertically relative to the housing 210 between the initial state and the actuating state for actuating the clutch actuator 260.

Referring to FIG. 18, the transmission assembly 306' is generally similar to the transmission assembly 306, except that the gears 328 and 330 of the previous embodiment are omitted in the transmission assembly 306'. In the embodiment of FIG. 18, the wand 310 can be slidably connected to the housing 210 via a slider 360. For example, the slider 360 can be fixedly connected to an upper end of the wand 310, and can be slidably received in a channel provided inside the housing 210. The wand 310 and the slider 360 can slide in unison upward and downward relative to the housing 210.

The toothed element 344 can be fixedly connected to the slider 360 and slidably connected to the guide rod 345, and can be engaged with the gear 326. Accordingly, the wand 310 and the toothed element 344 are slidable in unison relative to the housing 210, which causes the clutching element 332 to move for engaging with or disengaging from the gear 324 like described previously.

Like in the previous embodiment, the biasing spring 342 can be disposed around the guide rod 345, and can be connected to the housing 210 and the toothed element 344. When the wand 310 is released in the actuating state, the spring force of the biasing spring 342 can likewise urge the toothed element 344 to move, which results in a rotational displacement of the gear 326 in a direction that urges the clutching element 332 to disengage from the gear 324 and causes the wand 310 to recover the initial state.

Aside the transmission assembly 306', the remaining components of the control module 206 shown in FIG. 18 can be similar in construction and operation to the previous embodiment shown in FIG. 3.

Figure 19:
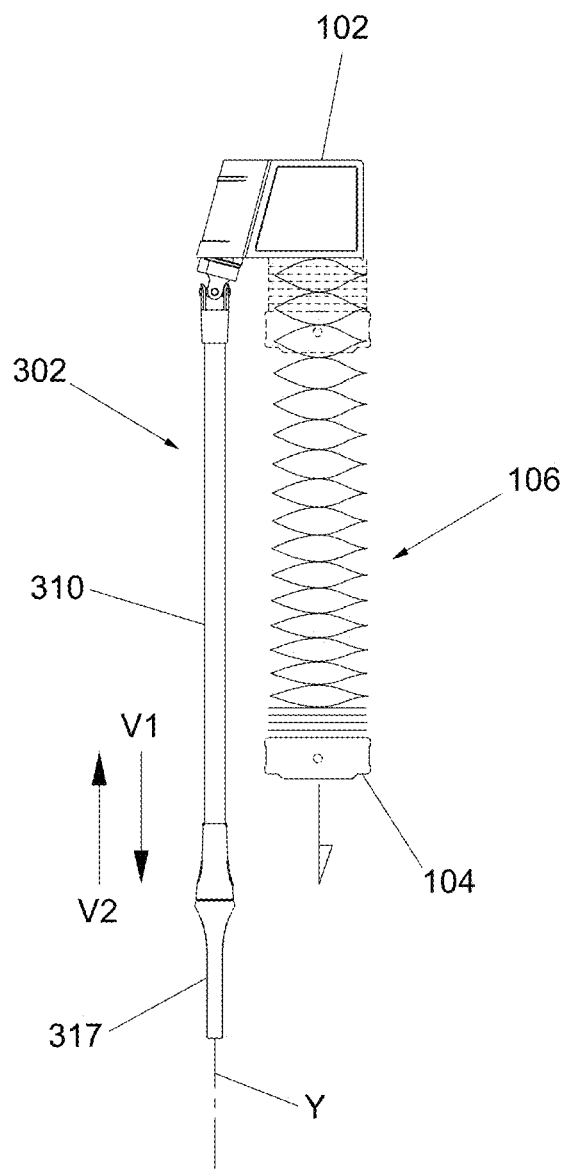
FIGS. 19 and 20 are schematic views illustrating exemplary operation for expanding a window shade provided with the control module shown in FIG. 18.
Figure 20:
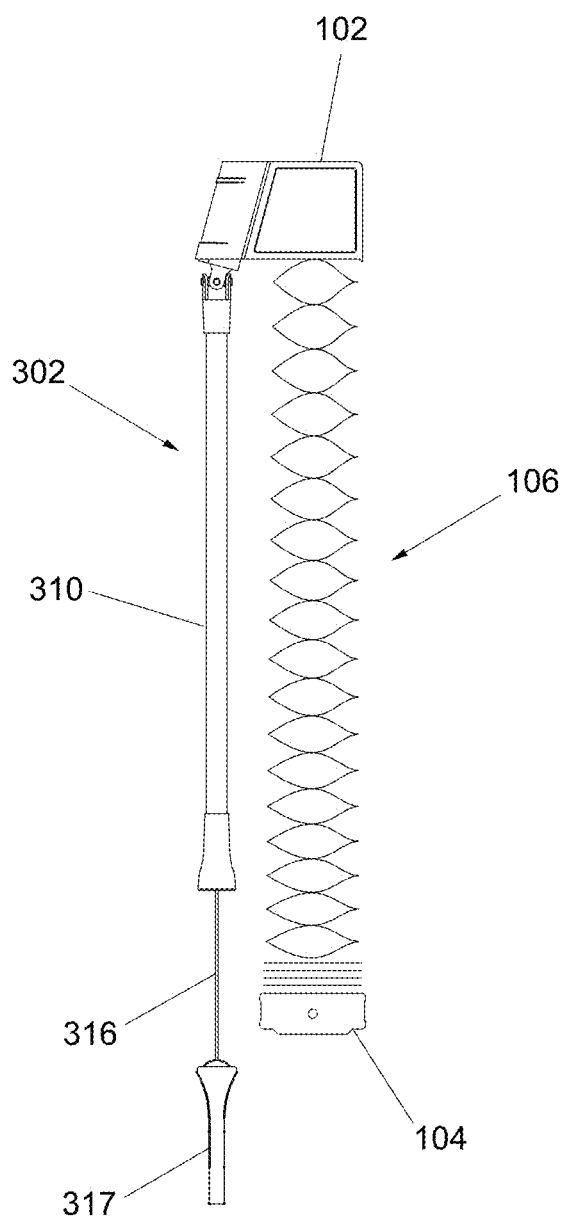

In conjunction with FIG. 18, FIGS. 19 and 20 are schematic views illustrating exemplary operation for expanding the window shade 100 provided with the control module 206 shown in FIG. 18. Referring to FIGS. 18 and 19, when the window shade 100 is to be expanded, a user can pull the wand 310 downward in a direction V1 from the initial state to the actuating state, and then release the wand 310 so that the biasing spring 342 urges the wand 310 to slide upward in the opposite direction V2 from the actuating state to the initial state. The displacement of the wand 310 from the initial state to the actuating state causes the clutch actuator 260 to rotate for switching the clutch 218 from the clutch coupling state to the clutch decoupling state. While the arrester 224 and the rotary element 226 remain stationary and the shift collar 228 remains in the coupling position, the transmission axle 202 and the axle adapter 214 can rotate for lowering the movable rail 104 under gravity action like described previously.

Referring to FIGS. 18 and 20, when the movable rail 104 moving downward reaches a desired position, the operating part 316 can be slightly pulled downward with the handle 317 and then can be released. Pulling the operating part 316 downward causes the spool 314 to rotate in the unwinding direction, which couples the lift actuating module 312 to the clutch actuator 260 and urges the clutch actuator 260 to rotate so that the clutch 218 is switched from the clutch decoupling state to the clutch coupling state. Releasing the operating part 316 after it is pulled downward causes the spool 314 to rotate in the winding direction, which decouples the lift actuating module 312 from the clutch actuator 260. Accordingly, the clutch 218 can remain in the clutch coupling state, and the braking force of the arrester 224 can be transferred through the shift collar 228, the rotary element 226 and the clutching elements 262 to the axle adapter 214 and the transmission axle 202 for keeping the movable rail 104 in the desired position.

For retracting the window shade 100 shown in FIGS. 19 and 20, the movable rail 104 can be raised by pulling and releasing the handle 317 like previously described.

Advantages of the structures described herein include the ability to provide an actuating system that is conveniently operable to lower and raise a movable rail of a window shade with reduced effort. Moreover, the actuating system is adaptable for use with different types of window shades, which can simplify the manufacture of window shades.

Realization of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
a transmission axle having a longitudinal axis and rotationally coupled to an axle adapter, the transmission axle and the axle adapter being rotatable about the longitudinal axis;
a brake assembly including an arrester, a rotary element rotatable about the longitudinal axis, and a shift collar configured to couple the rotary element to the arrester and decouple the rotary element from the arrester, the shift collar switching from a decoupling position to a coupling position in response to a rotation of the rotary element in a first direction and from the coupling position to the decoupling position in response to a rotation of the rotary element in a second direction opposite to the first direction; and
a clutch configured to couple and decouple the axle adapter from the rotary element, the clutch having a clutch actuator rotatable about the longitudinal axis, the clutch actuator being operable to switch the clutch between a clutch coupling state and a clutch decoupling state.

2. The actuating system according to claim 1, wherein the clutch actuator is rotatable along with the axle adapter and the rotary element when the clutch is in the clutch coupling state.

3. The actuating system according to claim 1, wherein the axle adapter and the transmission axle are prevented from rotating in the first direction when the shift collar is in the coupling position and the clutch is in the clutch coupling state.

4. The actuating system according to claim 1, wherein the shift collar is coupled to the arrester, the shift collar being movable along the longitudinal axis relative to the arrester between the coupling position where the shift collar is engaged with the rotary element and the decoupling position where the shift collar is disengaged from the rotary element.

5. The actuating system according to claim 4, wherein the shift collar is in sliding contact with the arrester via at least one ramp surface provided on the shift collar or the arrester.

6. The actuating system according to claim 4, wherein the arrester includes a braking spring disposed around a brake engaging part, and the shift collar is in sliding contact with the brake engaging part.

7. The actuating system according to claim 1, wherein the clutch further includes a clutching element that is coupled to the rotary element and is movably linked to the clutch actuator, the clutch actuator being rotatable to cause the clutching element to engage with and disengage from the axle adapter, the clutching element being engaged with the axle adapter in the clutch coupling state and disengaged from the axle adapter in the clutch decoupling state.

8. The actuating system according to claim 7, wherein the axle adapter has a sleeve provided with a plurality of teeth protruding inward from an inner wall of the sleeve, and the clutching element is engageable with any of the teeth in the clutch coupling state.

9. The actuating system according to claim 1, further comprising:
   a first operating device and a second operating device; and
   a transmission assembly configured to selectively couple the first operating device or the second operating device to the clutch actuator;
   wherein the first operating device is operable to urge the clutch actuator to rotate for switching the clutch from the clutch coupling state to the clutch decoupling state while the second operating device is operatively decoupled from the clutch actuator, and the second operating device is operable to urge the clutch actuator to rotate for switching the clutch from the clutch decoupling state to the clutch coupling state while the first operating device is operatively decoupled from the clutch actuator.

10. The actuating system according to claim 9, wherein while the shift collar is in the coupling position, the first operating device is operable to urge the clutch actuator to rotate for switching the clutch from the clutch coupling state to the clutch decoupling state so that the axle adapter and the transmission axle are rotatable relative to the rotary element and the arrester in the first direction.

11. The actuating system according to claim 9, wherein the second operating device is operable to urge the clutch actuator to rotate for switching the clutch from the clutch decoupling state to the clutch coupling state, whereby the rotary element is rotatable along with the axle adapter and the transmission axle in the second direction for switching the shift collar from the coupling position to the decoupling position.

12. The actuating system according to claim 9, wherein the first operating device comprises a wand, and the second operating device comprises a lift actuating module including a spool connected to an operating part, the spool being rotatable in a winding direction to wind the operating part and in an unwinding direction to unwind the operating part.

13. The actuating system according to claim 9, wherein the transmission assembly comprises:
   a first gear and a second gear meshed with each other;
   a first clutching element movable to engage with and disengage from the first gear for coupling and decoupling the first operating device from the clutch actuator; and
   a second clutching element movable to engage with and disengage from the second gear for coupling and decoupling the second operating device from the clutch actuator.

14. The actuating system according to claim 13, wherein the second clutching element is movable to engage with and disengage from a plurality of teeth provided on the second gear, the teeth being configured to urge the second clutching element to move away from the second gear in response to a rotation of the second gear induced by an operation of the first operating device.

15. The actuating system according to claim 13, wherein the second gear is rotationally locked to the clutch actuator so that the second gear and the clutch actuator are rotatable in unison about the longitudinal axis.

16. The actuating system according to claim 13, wherein the first operating device comprises a wand movably linked to the first clutching element, the wand being operable to cause the first clutching element to move for engaging with the first gear.

17. The actuating system according to claim 16, wherein the wand is slidable or rotatable to cause the first clutching element to move for engaging with the first gear.

18. The actuating system according to claim 16, wherein the wand is movable from an initial state to an actuating state to cause the first clutching element to move for engaging with the first gear, and the actuating system further comprises a biasing spring configured to assist the first clutching element in disengaging from the first gear.

19. The actuating system according to claim 13, wherein the second operating device comprises a lift actuating module including a spool that is connected to an operating part and is movably linked to the second clutching element, the spool being rotatable in a winding direction to wind the operating part and in an unwinding direction to unwind the operating part.

20. The actuating system according to claim 19, wherein a rotation of the spool in the unwinding direction causes the second clutching element to engage with the second gear, and a rotation of the spool in the winding direction causes the second clutching element to disengage from the second gear.

21. A window shade comprising:
   a head rail, a movable rail, and a shading structure disposed between the head rail and the movable rail;
   a winding unit assembled with the head rail, the winding unit being connected to the movable rail via a suspension element; and
   the actuating system according to claim 1, wherein the transmission axle is rotationally coupled to the winding unit, the transmission axle being rotatable in the first direction for lowering the movable rail and in the second direction for raising the movable rail.

* * * * *